US012234957B2

(12) United States Patent
Nam

(10) Patent No.: US 12,234,957 B2
(45) Date of Patent: Feb. 25, 2025

(54) LAMP FOR VEHICLE AND VEHICLE INCLUDING THE SAME

(71) Applicant: HYUNDAI MOBIS CO., LTD., Seoul (KR)

(72) Inventor: Gyung Mok Nam, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/446,434

(22) Filed: Aug. 8, 2023

(65) Prior Publication Data

US 2024/0110680 A1 Apr. 4, 2024

(30) Foreign Application Priority Data

Sep. 30, 2022 (KR) ........................ 10-2022-0125665

(51) Int. Cl.

| | |
|---|---|
| ***F21S 41/24*** | (2018.01) |
| ***F21S 41/143*** | (2018.01) |
| ***F21S 41/151*** | (2018.01) |
| ***F21S 41/153*** | (2018.01) |
| ***F21S 41/25*** | (2018.01) |

(52) U.S. Cl.

CPC ............. *F21S 41/24* (2018.01); *F21S 41/143* (2018.01); *F21S 41/151* (2018.01); *F21S 41/153* (2018.01); *F21S 41/25* (2018.01)

(58) Field of Classification Search

CPC ......... F21S 41/153; F21S 41/151; F21S 41/24

See application file for complete search history.

(56) References Cited

U.S. PATENT DOCUMENTS

| | | | | |
|---|---|---|---|---|
| 2014/0133168 A1* | 5/2014 | Fiederling | F21S 41/24 362/235 |
| 2015/0226395 A1* | 8/2015 | Taudt | F21S 41/25 362/511 |
| 2018/0370419 A1* | 12/2018 | Danner | F21S 41/143 |
| 2020/0072428 A1* | 3/2020 | Simchak | F21S 41/255 |

* cited by examiner

*Primary Examiner* — Tracie Y Green
*Assistant Examiner* — Michael Chiang
(74) *Attorney, Agent, or Firm* — DLA Piper LLP US

(57) ABSTRACT

A lamp for a vehicle includes a light source part including a plurality of light sources and a first lens part to which light irradiated from the light source part is input, the light source part includes one or more first light sources arranged in a horizontal direction and one or more second light sources spaced apart from the first light sources and arranged in the horizontal direction, the first lens part includes one or more first guide areas facing the first light sources in which light output from the first light sources is input, and one or more second guide areas facing the second light sources in which light output from the second light sources is input, and the first and second guide areas at least partially overlap each other in an upward/downward direction when the first lens part is viewed from one side in the horizontal direction.

16 Claims, 12 Drawing Sheets

LAMP FOR VEHICLE AND VEHICLE INCLUDING THE SAME

CROSS-REFERENCE TO RELATED APPLICATION

This application claims the benefit of priority to Korean Patent Application No. 10-2022-0125665, filed in the Korean Intellectual Property Office on Sep. 30, 2022, the entire contents of which are incorporated herein by reference.

TECHNICAL FIELD

The present disclosure relates to a lamp for a vehicle and a vehicle including the same, and more particularly to a lamp for a vehicle that may be applied to headlamps and a vehicle including the same.

BACKGROUND

An example of, among lamps for a vehicle, a bi-function lamps that may form various kinds of light distribution patterns may include a headlamp for a vehicle that may implement both of a low-beam light distribution pattern and a high-beam light distribution pattern. The above-described headlamp may implement a unified lighting image because both of lights that forms a low-beam light distribution pattern and a high-beam light distribution pattern are output through one inner lens.

However, according to a conventional technology, because an optical system for forming a low-beam light distribution pattern and an optical system for forming a high-beam light distribution pattern, except for an inner lens of a headlamp, are individually provided, a volume of a bi-function lamp increases and a structure thereof is complex. This is an element that hinders slimness of the lamp for a vehicle.

SUMMARY

The present disclosure has been made to solve the above-mentioned problems occurring in the prior art while advantages achieved by the prior art are maintained intact.

An aspect of the present disclosure provides a new type of a lamp for a vehicle that has a simple structure while being able to form various kinds of light distribution patterns The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part including a plurality of light sources that irradiate lights, and a first lens part, to which the lights irradiated from the light source part are input, the light source part includes one or more first light sources arranged in a horizontal direction “W”, and one or more second light sources spaced apart from the first light sources downwards and arranged in the horizontal direction “W”, wherein the first lens part includes one or more first guide areas that faces the first light sources and to which lights output from the first light sources are input, and one or more second guide areas that faces the second light sources and to which lights output from the second light sources are input, and the first guide areas and the second guide areas at least partially overlap each other in an upward/downward direction “H” when the first lens part is viewed from one side in the horizontal direction “W”.

The first guide areas and the second guide areas may share some areas.

Shapes of cross-sections of the first guide areas in the upward/downward direction “H” may be different from shapes of cross-sections of the second guide areas in the upward/downward direction “H”.

Each of upper borders of cross-sections of the first guide areas in the upward/downward direction “H” may include a shape that is convex upwards.

Each of upper borders of cross-sections of the first guide areas in the upward/downward direction “H” may include a shape of a parabola that is convex upwards.

Each of lower borders of cross-sections of the second guide areas in the upward/downward direction “H” may include a shape that is convex downwards.

Each of lower borders of cross-sections of the second guide areas in the upward/downward direction “H” may include a shape of an ellipse that is convex downwards.

Each of upper borders of cross-sections of the second guide areas in the upward/downward direction “H” may include a shape that is concave downwards.

Each of upper borders of cross-sections of the second guide areas in the upward/downward direction “H” may include a shape of a hyperbola that is concave downwards.

A plurality of second guide areas may be provided, and the one first guide areas may overlap two or more second guide areas when the first lens part is viewed from an upper side or a lower side.

The lamp may further include a second lens part provided on a front side of the first lens part and to which the light output from the first lens part is input, and the first guide areas and the second guide areas may meet each other in areas, in which imaginary lines L1 connecting the first light sources and a focus “F” of the second lens part and upper borders of the second guide areas meet each other, when the first lens part is viewed from a lateral side of the horizontal direction “W”.

The lamp may further include a second lens part provided on a front side of the first lens part and to which the light output from the first lens part is input, the first lens part may further include a light mixing area connected to front ends of the first guide areas and the second guide areas and in which lights introduced from the first guide area and the second guide area are mixed, and a focus “F” of the second lens part may be formed in an area, in which the first guide areas and the light mixing area are connected to each other, or an area, in which the second guide areas and the light mixing area are connected to each other.

The light source part may further include one or more third light sources spaced apart from the second light sources downwards and arranged in the horizontal direction “W”, and the first lens part may further include one or more third guide areas that faces the third light sources and to which lights output from the third light sources are input.

According to another aspect of the present disclosure, a vehicle includes a lamp provided on a front side thereof, the lamp includes a light source part including a plurality of light sources that irradiate lights, and a first lens part, to which the lights irradiated from the light source part is input, the light source part includes one or more first light sources arranged in a horizontal direction “W”, one or more second light sources spaced apart from the first light sources downwards and arranged in the horizontal direction “W”, and one or more third light sources spaced apart from the second light sources downwards and arranged in the horizontal direction "W", the first lens part includes one or more first guide areas that faces the first light sources and to which lights output from the first light sources are input, one or more second guide areas that faces the second light sources and to which lights output from the second light sources are input, and one or more third guide areas that faces the third light sources and to which lights output from the third light sources are input, and the first guide areas and the second guide areas at least partially overlap each other in an upward/downward direction "H" when the first lens part is viewed from one side in the horizontal direction "W".

The lights that are output to an outside via the first light sources and the first guide areas and the lights that are output to the outside via the second light sources and the second guide areas may form a low-beam light distribution pattern, and the lights that are output to the outside via the third light sources and the third guide areas may form a high-beam light distribution pattern.

A plurality of first light sources may be provided, and the plurality of first light sources may be controlled to be turned on and off integrally.

A plurality of second light sources may be provided, some of the plurality of second light sources may be controlled to be turned on and off individually, and the others of the plurality of second light sources may be controlled to be turned on and off integrally.

A plurality of third light sources may be provided, and the plurality of third light sources may be controlled to be turned on and off individually.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a lamp for a vehicle and a vehicle according to the present disclosure will be described with reference to the drawings.

Lamp for Vehicle

Figure 1:
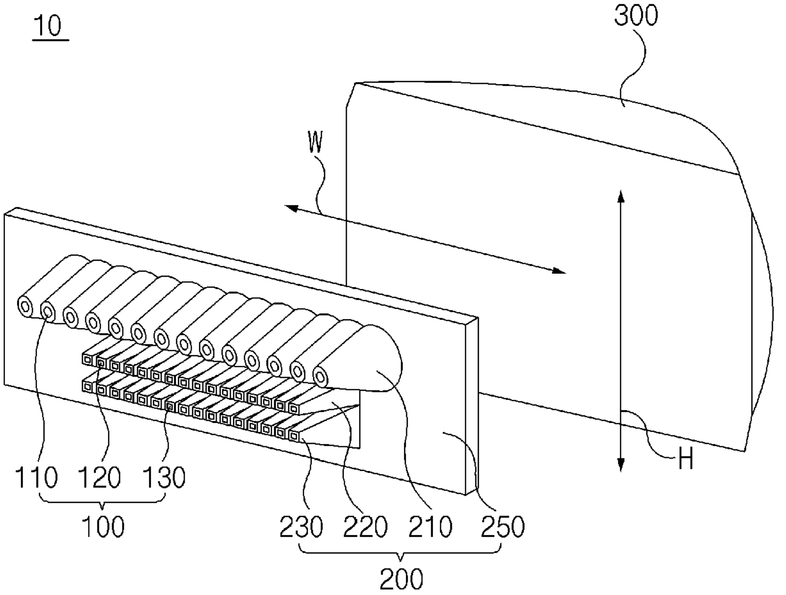
FIG. 1 is a perspective view illustrating a lamp for a vehicle according to the present disclosure.
Figure 2:
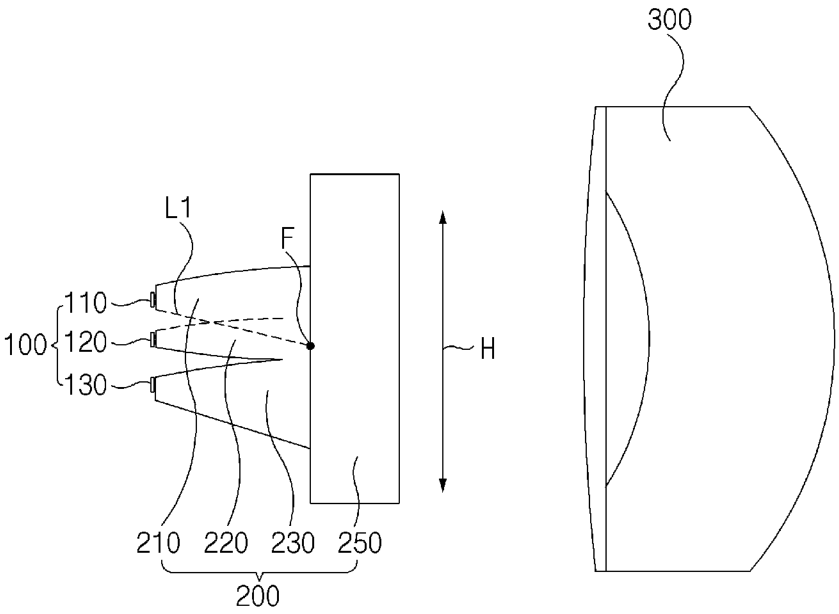
FIG. 2 is a side cross-sectional views illustrating a lamp for a vehicle according to the present disclosure.
Figure 3:
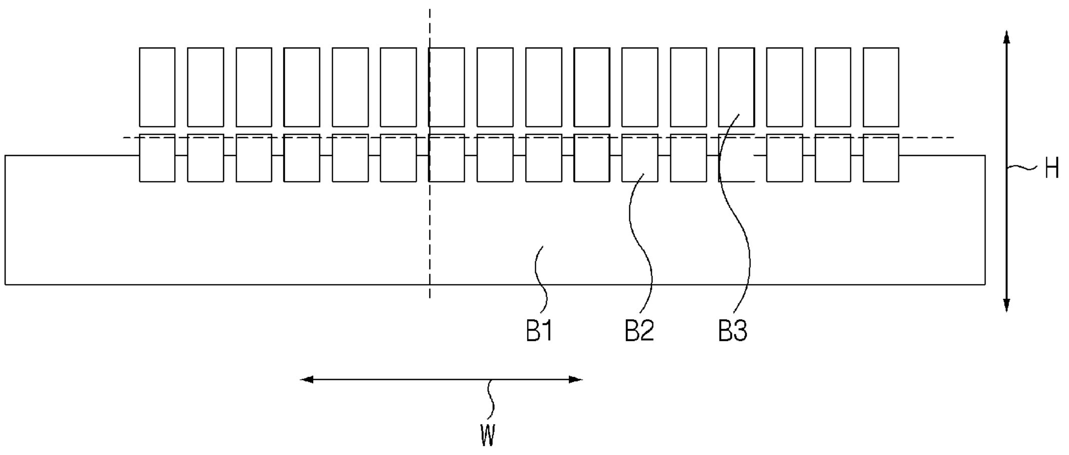
FIG. 3 is a view illustrating a light distribution area formed by a lamp for a vehicle according to the present disclosure.
Figure 4:
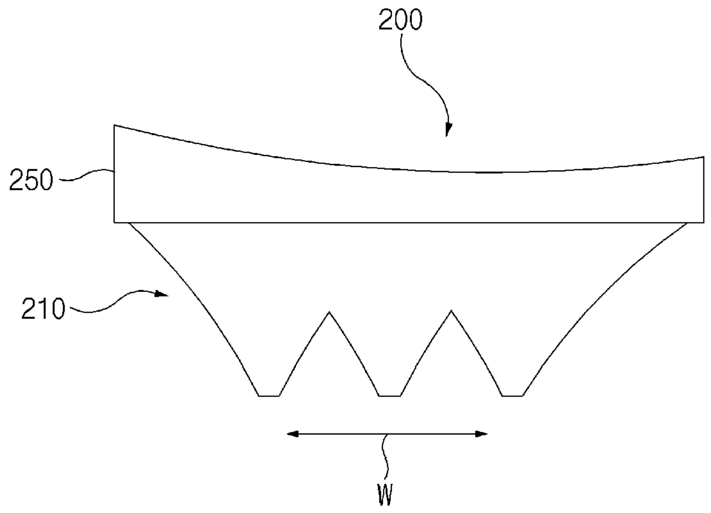
FIG. 4 is a plan view of a first guide area provided in a first lens part of a lamp for a vehicle according to the present disclosure.
Figure 5:
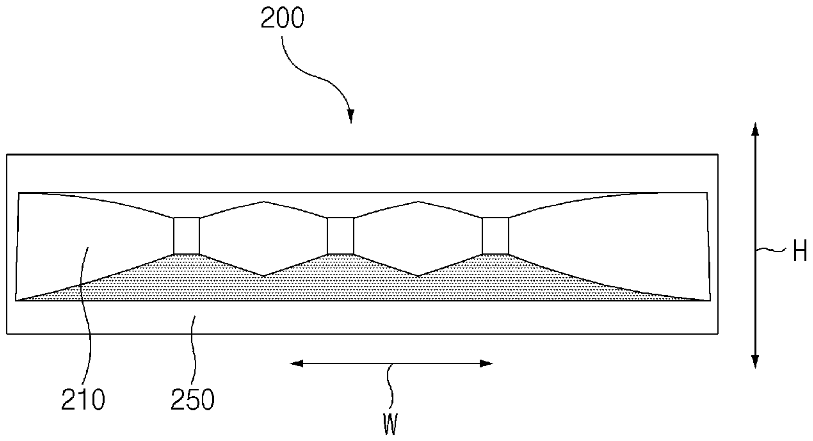
FIG. 5 is a rear view of a first guide area provided in a first lens part of a lamp for a vehicle according to the present disclosure.
Figure 6:
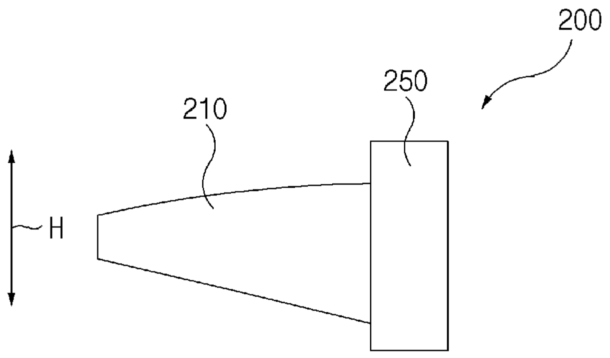
FIG. 6 is a side sectional view of a first guide area provided in a first lens part of a lamp for a vehicle according to the present disclosure.
Figure 7:
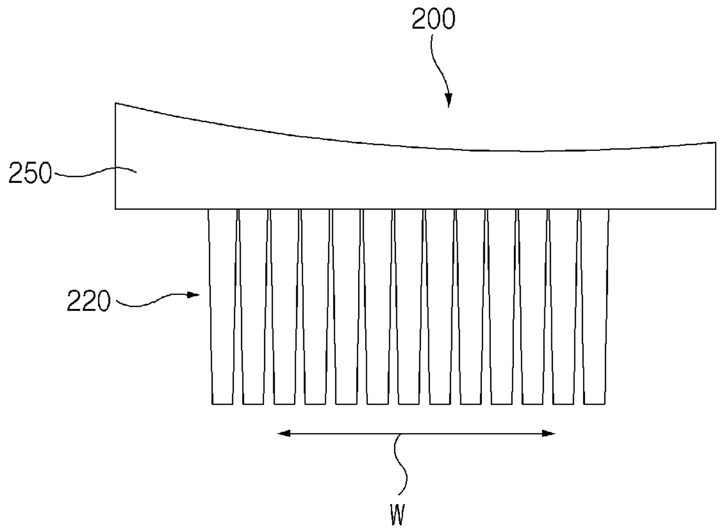
FIG. 7 is a plan view of a second guide area provided in a first lens part of a lamp for a vehicle according to the present disclosure.
Figure 8:
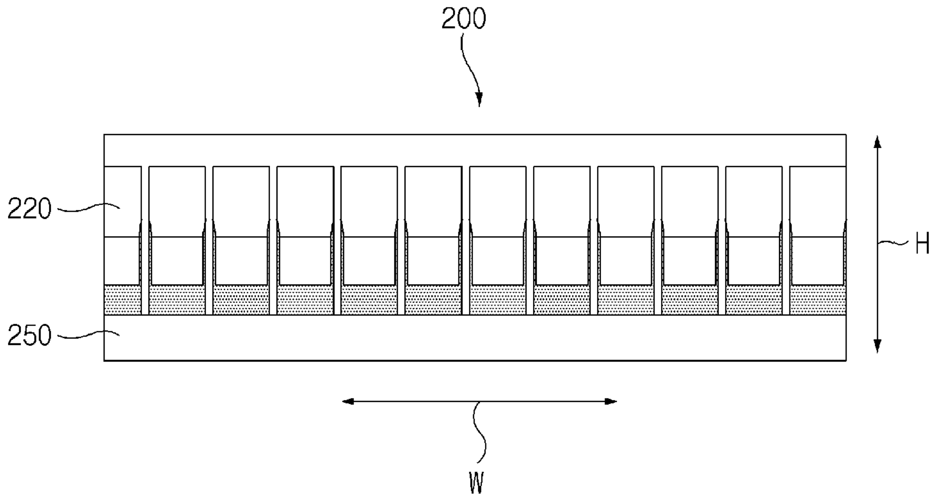
FIG. 8 is a rear view of a second guide area provided in a first lens part of a lamp for a vehicle according to the present disclosure.
Figure 9:
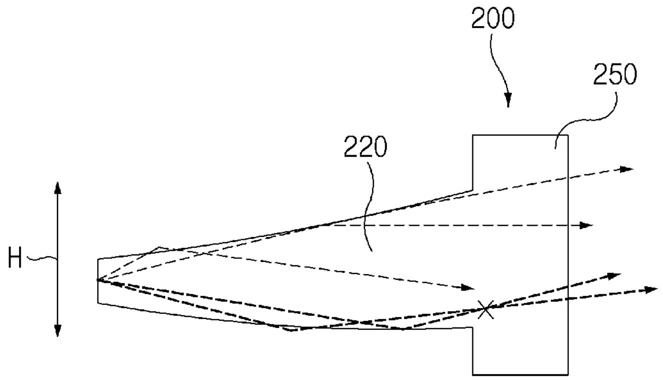
FIG. 9 is a side cross-sectional view of a second guide area provided in a first lens part of a lamp for a vehicle according to the present disclosure.
Figure 10:
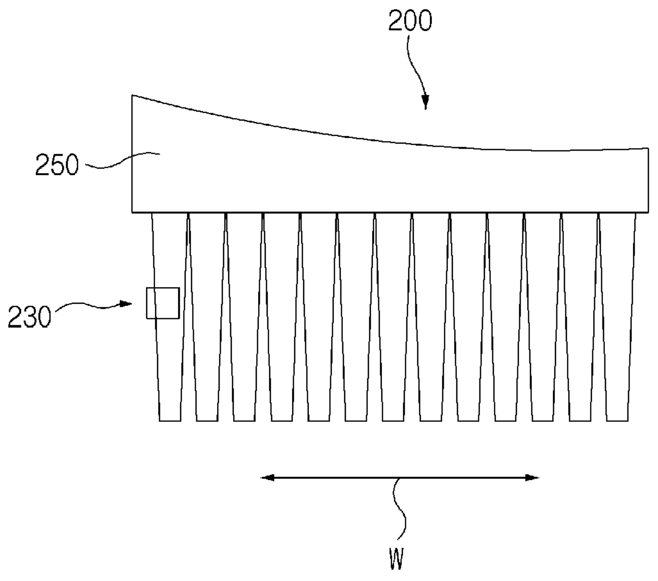
FIG. 10 is a plan view of a third guide area provided in a first lens part of a lamp for a vehicle according to the present disclosure.
Figure 11:
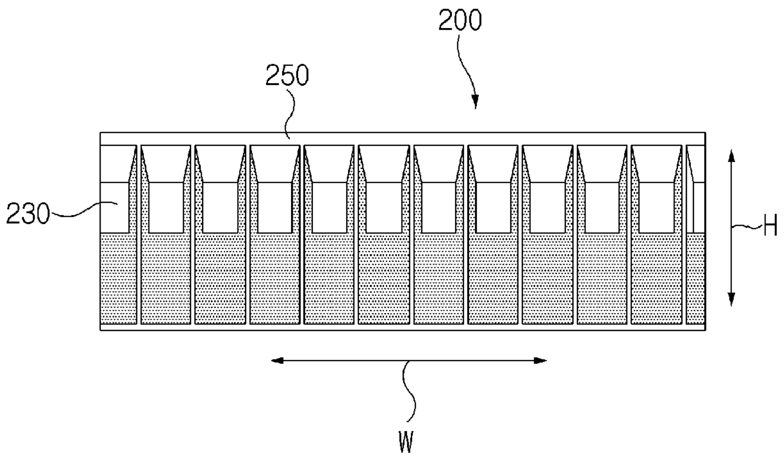
FIG. 11 is a rear view of a third guide area provided in a first lens part of a lamp for a vehicle according to the present disclosure.
Figure 12:
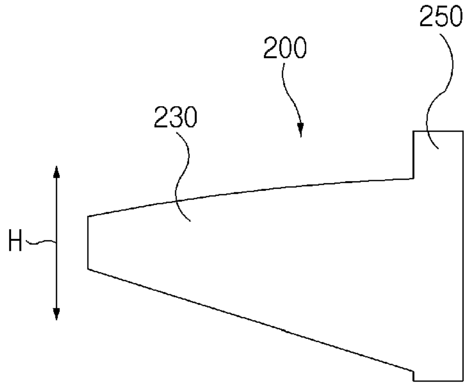
FIG. 12 is a side cross-sectional view of a third guide area provided in a first lens part of a lamp for a vehicle according to the present disclosure.

FIG. 1 is a perspective view illustrating a lamp for a vehicle according to the present disclosure, and FIG. 2 is a side cross-sectional views illustrating the lamp for a vehicle according to the present disclosure. FIG. 3 is a view illustrating a light distribution area formed by the lamp for a vehicle according to the present disclosure, and FIG. 4 is a plan view of a first guide area provided in a first lens part of the lamp for a vehicle according to the present disclosure. FIG. 5 is a rear view of the first guide area provided in the first lens part of the lamp for a vehicle according to the present disclosure, and FIG. 6 is a side sectional view of the first guide area provided in the first lens part of the lamp for a vehicle according to the present disclosure. FIG. 7 is a plan view of a second guide area provided in the first lens part of the lamp for a vehicle according to the present disclosure, and FIG. 8 is a rear view of the second guide area provided in the first lens part of the lamp for a vehicle according to the present disclosure. FIG. 9 is a side cross-sectional view of the second guide area provided in the first lens part of the lamp for a vehicle according to the present disclosure, and FIG. 10 is a plan view of a third guide area provided in the first lens part of the lamp for a vehicle according to the present disclosure. Furthermore, FIG. 11 is a rear view of the third guide area provided in the first lens part of the lamp for a vehicle according to the present disclosure, and FIG. 12 is a side cross-sectional view of the third guide area provided in the first lens part of the lamp for a vehicle according to the present disclosure.

A lamp for a vehicle according to the present disclosure may be a configuration for forming a plurality of light distribution patterns having different functions. As an example, the lamp for a vehicle according to the present disclosure may be a configuration that may implement a high-beam light distribution pattern and a low-beam light distribution pattern together. More preferably, the lamp for a vehicle according to the present disclosure may implement bending light that help recognize a ground surface and an object in a steering direction by forming an additional light distribution area in the steering direction in a low-beam light distribution pattern according to the steering direction of the vehicle, and also may implement an intelligent front lighting system (IFS) that prevents dazzling of a driver of a front vehicle or a pedestrian by temporarily removing a portion of a high-beam light distribution pattern according to present of the front vehicle or the pedestrian. Hereinafter, a means for implementing both of the bending light and the IFS, which have been described above, will be described.

Referring to FIGS. 1 and 2, a lamp 10 (hereinafter, referred to as a 'lamp') for a vehicle according to the present disclosure may include a light source part 100 including a plurality of light sources that irradiate light, a first lens part 200, to which the light irradiated from the light source part 100 is input, and a second lens part 300 provided on a front side of the first lens part 200 and to which the light output from the first lens part 200 is input. The first lens part 200 and the second lens part 300 may be configurations for causing the lamp 10 according to the present disclosure to form a specific light distribution pattern by guiding the light output from the light source part 100. In more detail, the light output from the light source part 100 and guided by the first lens part 200 and the second lens part 300 may be output to an outside after being reversed upwards and downwards by the second lens part 300.

In more detail, the light source part 100 may include one or more first light sources 110 that are arranged in a horizontal direction "W" of the lamp 10, and one or more second light sources 120 that are spaced apart from the first light sources 110 downwards and are arranged in the horizontal direction "W", and the first lens part 200 may include one or more first guide areas 210 that are configured to face the first light sources 110 and to which the lights output from the first light sources 110 are input, and one or more second guide areas 220 that are configured to face the second light sources 120 and to which the lights output from the second light sources 120 are input. According to the present disclosure, the lights that are output from the first light sources 110 and are output to an outside after being input to the first guide areas 210 and the lights that are output from the second light sources 120 and are output to an outside after being input to the second guide areas 220 may form a low-beam light distribution pattern. In more detail, the lights that are output from the first light sources 110 and are output to an outside after being input to the first guide areas 210 may form a lower area and a peripheral light distribution area (reference symbol B1 of FIG. 3) of the low-beam light distribution pattern, and the lights that are output from the second light sources 120 and are output to an outside after being input to the second guide areas 220 may form an upper area and a central light distribution area (see reference symbol B2 of FIG. 3) of the low beam light distribution pattern.

Furthermore, the light source part 100 may further include one or more third light sources 130 that are spaced apart from the second light sources 120 downwards and are arranged in the horizontal direction "W", and the first lens part 200 may further include one or more third guide areas 230 that are configured to face the third light sources 130 and to which the lights output from the third light sources 130 are input. According to the present disclosure, the lights that are output from the third light sources 130 and are output to an outside after being input to the third guide areas 230 may form a high-beam light distribution pattern (see reference symbol B3 of FIG. 3).

Meanwhile, referring to FIGS. 1 to 3, the light distribution pattern formed by the lights output from the first light sources 110 and the light distribution pattern formed by the lights output from the second light sources 120 may partially overlap each other in an upward/downward direction. This is because, as described above, the low-beam light distribution pattern is formed by the lights output from the first light sources 110 and the lights output from the second light sources 120.

Then, as described above, to partially overlap the light distribution pattern formed by the lights output from the first light sources 110 and the light distribution pattern formed by the lights output from the second light sources 120 in the upward/downward direction, the first guide areas 210 and the second guide areas 220 may be configured to at least partially overlap each other in a upward/downward direction "H" when the first lens part 200 is viewed from one side in the horizontal direction "W" as illustrated in FIG. 1. This may be a concept including an aspect that the first guide areas 210 and the second guide areas 220 may be integrally formed such that some areas thereof are shared and the first guide areas 210 and the second guide areas 220 are spaced apart from each other such that the first guide areas 210 and the second guide areas 220 partially overlap each other when viewed from a lateral side. However, according to a preferred embodiment of the present disclosure, as illustrated in FIGS. 1 and 2, the first guide areas 210 and the second guide areas 220 may share some areas. Accordingly, according to the present disclosure, some of the lights output from the first light sources 110 and introduced into the first guide areas 210 may be input to the second guide areas 220 via areas, in which the first guide areas 210 and the second guide areas 220 overlap each other, and to the contrary, a portion of some of the lights output from the second light sources 120 and introduced to the second guide areas 220 may be input to the first guide areas 210 via areas, in which the first guide areas 210 and the second guide areas 220 overlap each other. Accordingly, as illustrated in FIG. 3, B1 that is a light distribution pattern formed by the lights output from the first light sources 110 and B2 that is a light distribution pattern formed by the lights output from the second light sources 120 may partially overlap each other. Hereinafter, detailed shapes of the first to third guide areas 210, 220, and 230 provided in the first lens part 200 will be described.

Referring to FIGS. 4 to 9, shapes of cross-sections of the first guide areas 210 in the upward/downward direction "H" may be different from shapes of the second guide areas 220 in the upward/downward direction "H".

In more detail, as illustrated in FIGS. 4 to 6, each of upper borders of the cross-sections of the first guide areas 210 in the upward/downward direction "H" may include or have a shape that is convex upwards. This is for causing the lights output from the first light sources 110 and into to the first guide area 210 to travel to a front side again after being totally reflected without being discharging upwards after reaching the upper borders of the first guide areas 210 to minimize an amount of the lights that are lost while not contributing to the light distribution pattern. More preferably, each of the borders of the cross-sections of the first guide areas 210 in the upward/downward direction "H" may include or have a shape of a parabola that is convex upwards.

Meanwhile, referring to FIGS. 7 to 9, each of the lower borders of the cross-sections of the second guide areas 220 in the upward/downward direction "H" may include or have a shape that is convex downwards. This is for causing the lights output from the second light sources 120 to be output to an outside while being condensed in the upward/downward direction after being input to the second guide areas 220 to sufficiently secure intensities of lights of the upper area and the central light distribution area B2 of the low-beam light distribution pattern. More preferably, each of the lower borders of the cross-sections of the second guide areas 220 may include or have an elliptical shape that is convex downwards, and the second light sources 120 may be located at focuses of the above-described ellipses.

Meanwhile, each of the upper borders of the cross-sections of the second guide areas 220 in the upward/downward direction "H" may include or have a shape that is concave downwards. This may be for causing, among the lights output from the second light sources 120, the light that reaches to a vicinity of the light distribution area B1 formed by the lights output from the light output from the first light sources 110 to be spread in the upward/downward direction wherein a rapid change in the intensities of lights for the areas of the low-beam light distribution pattern may be prevented by gradually changing the intensities of the lights as they go to the light distribution area B2 formed by the second light sources 120 from the light distribution area B1 formed by the first light sources 110. More preferably, each of the upper borders of the cross-sections of the second guide areas 220 in the upward/downward direction “H” may include or have a shape of a hyperbola that is concave downwards, and the second light sources 120 may be located at a focus of the above-described hyperbola.

Meanwhile, referring to FIGS. 10 to 12, a plurality of third guide areas 230 may be spaced apart from each other in the horizontal direction “W”. As described above, the lights that are output from the third light sources 130 and are input to the third guide areas 230 may implement an adaptive light distribution pattern, that is, the IFS for preventing dazzling of a front side. Accordingly, when the plurality of third guide areas 230 are spaced apart from each other in the horizontal direction “W”, they may contribute to forming independent light distribution patterns while the light distribution patterns formed by the plurality of third light sources 130 do not overlap each other.

Referring back to FIGS. 1 and 2, the numbers of the first to third guide areas 210, 220, and 230 may be plural, respectively. Then, when the lamp 10 or the first lens part 200 is viewed from an upper side or a lower side, one first guide area 210 may overlap two or more second guide areas 220. This may be understood that widths of the first guide areas 210 in the horizontal direction “W” are larger than widths of the second guide areas 220 in the horizontal direction “W”. As described above, this may be because the lights that are output from the first light sources 110 and are input to the first guide areas 210 form the lower area of the low-beam light distribution pattern and the peripheral light distribution area B1, and thus a lower intensity of light is required whereby the width of the light distribution pattern formed by the one first light source 110 in the horizontal direction “W” is larger than the width of the light distribution pattern formed by the one second light source 120 in the horizontal direction “W”.

Meanwhile, as described above, according to the present disclosure, the first guide areas and the second guide areas may be configured to share some areas. Then, as illustrated in FIG. 2, according to a preferred embodiment, when the first lens part 200 is viewed from a lateral side in the horizontal direction “W”, the first guide areas 210 and the second guide areas 220 may meet each other in areas, in which imaginary lines L1 connecting the first light sources 110 and a focus “F” of the second lens part 300 and the upper borders of the second guide areas meet each other. This may be for causing the lights output from the third light sources 130 to form a light distribution pattern below imaginary lines L1 connecting the third light sources 130 and the focus “F” of the second lens part 300 for the light distribution pattern formed by the third light sources 130 to satisfy the rules that relate to the low-beam light distribution pattern required.

Meanwhile the first lens part 200 may further include a light mixing area 250 that are connected to front ends of the first guide areas 210, the second guide areas 220, and the third guide areas 230 and in which the lights introduced from the first guide areas 210, the second guide areas 220, and the third guide areas 230 are at least partially mixed. For example, the light mixing area 250 may have a plate shape.

Then, as illustrated in FIG. 2, according to the present disclosure, the focus “F” of the second lens part 300 may be formed in areas, in which the first guide areas 210 and the light mixing area 250 are connected to each other, or areas, in which the second guide areas 220 and the light mixing area 250 are connected to each other. This may be understood that the focus “F” of the second lens part 300 is located on a rear side of the light mixing area 250.

Vehicle

Hereinafter, a vehicle according to the present disclosure will be described with reference to the drawings and the above-described contents.

The vehicle according to the present disclosure may include the lamp 10 for a vehicle. In more detail, the lamp 10 may be provided on a front side of the vehicle.

Then, the lamp 10 may include the light source part 100 including the plurality of light sources that irradiate lights, and the first lens part 200, to which the lights irradiated from the light source part 100 are input. In more detail, the light source part 100 may include the one or more first light sources 110 that are arranged in the horizontal direction “W”, the one or more second light sources 120 that are spaced apart from the first light sources 110 downwards and are arranged in the horizontal direction “W”, and the one or more third light sources 130 that are spaced apart from the second light sources 120 downwards and are arranged in the horizontal direction “W”. Furthermore, the first lens part 200 may include the one or more first guide areas 210 that are configured to face the first light sources 110 and to which the lights output from the first light sources 110 are input, the one or more second guide areas 220 that are configured to face the second light sources 120 and to which the lights output from the second light sources 120 are input, and the one or more third guide areas 230 that are configured to face the third light sources 130 and to which the lights output from the third light sources 130 are input.

Then, according to the present disclosure, when the first lens part 200 is viewed from a lateral side in the horizontal direction “W”, the first guide areas 210 and the second guide areas 220 may at least partially overlap each other in the upward/downward direction “H”.

Furthermore, according to the present disclosure, the lights output to an outside via the first light sources 110 and the first guide areas 210 and the lights output to an outside via the second light sources 120 and the second guide areas 220 may form a low-beam light distribution pattern, and the lights output to an outside via the third light sources 130 and the third guide areas 230 may form a high-beam light distribution pattern.

In a more preferable embodiment, the plurality of first light sources 110 are provided, and the plurality of first light sources 110 may be controlled to be turned on and off integrally. That is, all of the plurality of first light sources 110 that form the lower area of the low-beam light distribution pattern and the peripheral light distribution area B1 may be turned on or turned off.

Meanwhile, the plurality of second light sources 120 may be provided, and some of the plurality of second light sources 120 may be controlled to be turned on and off individually whereas the others of the plurality of second light sources 120 may be controlled to be turn on and off integrally. In more detail, among the plurality of second light sources 120, the second light sources 120 that are controlled to be turned on and off integrally may be for forming the low-beam light distribution pattern formed when the vehicle travels straight forwards, and, among the second light sources 120, the second light sources 120 that are controlled to be turned on and off individually may be for forming an additional low-beam light distribution pattern (that is, the bending light) in the steering direction when the vehicle is steered to the left side or the right side.

Furthermore, the plurality of third light sources 130 may be provided, and the plurality of third light sources 130 may be controlled to be turned on and off individually. As described above, the lights output from the third light sources 130 may form a high-beam light distribution pattern. Accordingly, when the plurality of third light sources 130 are controlled to be turned on and off individually, the third light sources 130 that irradiate the lights to an area, in which a front vehicle or a pedestrian is present, whereby the IFS that is an adaptive light distribution pattern may be implemented.

Meanwhile, the above-described contents of the lamp for a vehicle according to the present disclosure may be applied to the lamp provided in the vehicle of the present disclosure in the same way, and the above-described contents of the vehicle of the present disclosure also may be applied to the lamp for a vehicle according to the present disclosure in the same way.

According to the present disclosure, a new type of a lamp for a vehicle that has a simple structure while being able to form various kinds of light distribution patterns may be provided.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp for a vehicle, comprising:

a light source part comprising a plurality of light sources that irradiate light; and a first lens part to which the light irradiated from the light source part is input, wherein the light source part comprises:

one or more first light sources arranged in a horizontal direction; and one or more second light sources spaced apart from the first light sources downwards and arranged in the horizontal direction, wherein the first lens part includes:

one or more first guide areas configured to face the first light sources and to which light output from the first light sources is input; and one or more second guide areas configured to face the second light sources and to which light output from the second light sources is input, wherein the first guide areas and the second guide areas at least partially overlap each other in an upward/downward direction when the first lens part is viewed from one side in the horizontal direction;

wherein a plurality of second guide areas is provided, and the one first guide area overlaps two or more second guide areas when the first lens part is viewed from an upper side or a lower side.

2. The lamp of claim 1, wherein the first guide areas and the second guide areas share some areas.

3. The lamp of claim 1, wherein shapes of cross-sections of the first guide areas in the upward/downward direction are different from shapes of cross-sections of the second guide areas in the upward/downward direction.

4. The lamp of claim 1, wherein each of upper borders of cross-sections of the first guide areas in the upward/downward direction comprises a shape that is convex upwards.

5. The lamp of claim 1, wherein each of upper borders of cross-sections of the first guide areas in the upward/downward direction comprises a shape of a parabola that is convex upwards.

6. The lamp of claim 1, wherein each of lower borders of cross-sections of the second guide areas in the upward/downward direction comprises a shape that is convex downwards.

7. The lamp of claim 1, wherein each of lower borders of cross-sections of the second guide areas in the upward/downward direction comprises a shape of an ellipse that is convex downwards.

8. The lamp of claim 1, wherein each of upper borders of cross-sections of the second guide areas in the upward/downward direction comprises a shape that is concave downwards.

9. The lamp of claim 1, wherein each of upper borders of cross-sections of the second guide areas in the upward/downward direction comprises a shape of a hyperbola that is concave downwards.

10. The lamp of claim 1, further comprising:

a second lens part provided on a front side of the first lens part and to which the light output from the first lens part is input, wherein the first and second guide areas meet each other in areas in which imaginary lines connecting the first light sources and a focus of the second lens part and upper borders of the second guide areas meet each other when the first lens part is viewed from a lateral side of the horizontal direction.

11. The lamp of claim 1, further comprising:

a second lens part provided on a front side of the first lens part and to which the light output from the first lens part is input, wherein the first lens part further comprises:

a light mixing area connected to front ends of the first guide areas and the second guide areas and in which light introduced from the first and second guide areas are mixed, and wherein a focus of the second lens part is formed in an area in which the first guide areas and the light mixing area are connected or an area in which the second guide areas and the light mixing area are connected.

12. The lamp of claim 1, wherein the light source part further comprises:

one or more third light sources spaced apart from the second light sources downwards and arranged in the horizontal direction, and wherein the first lens part further comprises:

one or more third guide areas configured to face the third light sources and to which light output from the third light sources is input.

13. A vehicle comprising:

a lamp provided on a front side of the vehicle, the lamp comprising:

a light source part including a plurality of light sources that irradiate light; and a first lens part to which the light irradiated from the light source part is input, wherein the light source part comprises:

one or more first light sources arranged in a horizontal direction;

one or more second light sources spaced apart from the first light sources downwards and arranged in the horizontal direction; and wherein the first lens part comprises:

one or more first guide areas configured to face the first light sources and to which light output from the first light sources is input;

one or more second guide areas configured to face the second light sources and to which light output from the second light sources is input; and wherein the first and second guide areas at least partially overlap each other in an upward/downward direction when the first lens part is viewed from one side in the horizontal direction; and wherein:

a plurality of second light sources is provided, some of the plurality of second light sources are controlled to be turned on and off individually, and others of the plurality of second light sources are controlled to be turned on and off integrally.

14. The vehicle of claim 13, wherein the light source part comprises:

one or more third light sources spaced apart from the second light sources downwards and arranged in the horizontal direction, wherein the first lens part comprises:

one or more third guide areas configured to face the third light sources and to which light output from the third light sources is input, wherein the light output to an outside via the first light sources and the first guide areas and the light output to the outside via the second light sources and the second guide areas form a low-beam light distribution pattern, and the light output to the outside via the third light sources and the third guide areas form a high-beam light distribution pattern.

15. The vehicle of claim 13, wherein a plurality of first light sources are provided, and the plurality of first light sources are controlled to be turned on and off integrally.

16. The vehicle of claim 13, wherein a plurality of third light sources are provided, and the plurality of third light sources are controlled to be turned on and off individually.

* * * * *